UNITED STATES PATENT OFFICE.

LUDWIG HELD, OF HARLEM, NEW YORK.

IMPROVED COMPOSITION FOR LINING BARRELS.

Specification forming part of Letters Patent No. 48,398, dated June 27, 1865.

*To all whom it may concern:*

Be it known that I, LUDWIG HELD, of Harlem, in the county of New York and State of New York, have invented a new and Improved Composition for Enameling Metal, Wood, and other Surfaces; and I do hereby declare that the following is a full, clear, and exact description thereof, which will enable others skilled in the art to fully understand and make use of the same.

This invention relates to a composition the chief ingredients of which are carbonate of lime and silicic acid, together with such other chemicals which assist in the formation of an insoluble silicate, in such a manner that by the application of said ingredients to metal, stone, or other surfaces an enamel is formed which is capable of resisting the influence of heat and of water, oils, and most acids. By the addition of some substance containing iron—such as brown-spar, copperas, &c.—the composition above named forms an intimate combination with the wood fiber, and in this state it is particularly fit as a lining for barrels and other vessels intended to contain petroleum and other penetrating liquids.

The composition which I use for enameling metal, stone, wood, and other surfaces consists of the ingredients hereinafter named, and mixed in about the following proportion: clay, twenty-seven parts; silicic acid, sixty-eight parts; potash, twenty-two parts; sulphate of soda, twenty-eight parts; coal or carbon, eight parts. The composition of clay, silicic acid, potash, sulphate of soda, and bone is effected by placing the ingredients in a boiler and heating them to such a degree that the silicic acid enters into a combination with the alkalies. During this process the clay is decomposed and the silicic acid contained in it is given up to the alkalies, and thereby the combination of the sand or pure silicic acid with the alkalies is facilitated. Coal and sulphate of soda are added as a substitute for carbonate of soda, which latter salt is formed during the heating process. The composition obtained is dissolved in water. By adding to this composition a certain quantity of carbonate of lime—for instance, ten to fifteen per cent.—an enamel is formed which adheres readily to stone, metal, and other surfaces, and forms a protection capable to resist high degrees of heat and the influence of water and oils, and also most acids.

The composition can be applied by means of a brush or in any other suitable manner.

In order to cause this composition to adhere more readily to wood, I mix the carbonate of lime with graphite, brown-spar, copperas, or other material containing iron, or I treat the wood first with a solution of such material and afterward with the above-named composition and carbonate of lime. By the action of the iron my composition undergoes an intimate combination with the wood fiber, and when applied in this manner to the interior of barrels or other vessels it forms a lining which is particularly capable to resist petroleum or other penetrating liquids, and which renders said barrels perfectly oil and air tight.

I claim as new and desire to secure by Letters Patent—

1. The within-described composition, when the same is applied in combination with carbonate of lime, substantially as and for the purpose set forth.

2. The within-described composition, when applied in combination with carbonate of lime and graphite, brown-spar, copperas, or other material containing iron, particularly as a lining for barrels or other vessels.

L. HELD.

Witnesses:
 W. HAUFF,
 WM. DEAN OVERELL.